(12) United States Patent
Broome et al.

(10) Patent No.: US 6,496,465 B1
(45) Date of Patent: Dec. 17, 2002

(54) MONOLITHIC CD/DVD READ/WRITE HEAD

(76) Inventors: Barry G. Broome, 300 Carlsbad Village Dr., Carlsbad, CA (US) 92008; Jenkin A. Richard, 1375 Montecito Ave., Mountain View, CA (US) 94043

( * ) Notice: Subject to any disclaimer, the term of this patent is extended or adjusted under 35 U.S.C. 154(b) by 0 days.

(21) Appl. No.: 09/327,411

(22) Filed: Jun. 7, 1999

Related U.S. Application Data

(60) Provisional application No. 60/088,669, filed on Jun. 9, 1998.

(51) Int. Cl.$^7$ .............................................. G11B 7/135
(52) U.S. Cl. ................................ 369/112.08; 369/44.12; 369/44.37; 369/112.19; 369/112.2; 369/112.26
(58) Field of Search ........................... 369/44.12, 44.14, 369/44.37, 44.38, 44.23, 44.24, 112.17, 112.2, 121, 122, 112.19, 94, 112.21, 112.23, 118, 112.01, 112.26, 112.08; 359/434, 819; 600/160

(56) References Cited

U.S. PATENT DOCUMENTS

| | | | | |
|---|---|---|---|---|
| 4,334,300 A | * | 6/1982 | Arquie et al. | 369/44.12 |
| 4,784,118 A | * | 11/1988 | Fantone et al. | 600/160 |
| 5,783,818 A | * | 7/1998 | Manabe et al. | 369/44.14 |
| 5,784,354 A | * | 7/1998 | Lee | 369/112.19 |
| 5,793,734 A | * | 8/1998 | Tsuchiya et al. | 369/44.23 |
| 5,956,312 A | * | 9/1999 | Ishihara | 369/112.21 |
| 5,991,255 A | * | 11/1999 | Takahashi | 369/112.23 |
| 6,266,314 B1 | * | 7/2001 | Fukakusa et al. | 369/112.01 |

* cited by examiner

Primary Examiner—W. R. Young
Assistant Examiner—Kim-Kwok Chu
(74) Attorney, Agent, or Firm—Bruce H. Johnsonbaugh

(57) ABSTRACT

A read head optical system capable of reading either CD or DVD disks is provided. A monolithic molded hollow plastic block includes three lenses integrally molded into its exterior surfaces. A 780 nm laser diode is aligned with the first lens for reading CD disks, a 655 nm laser is aligned with the second lens for reading DVD disks and a detector for providing signal, focus and tracking data is aligned with the third molded lens. The hollow plastic block has an interior cavity adapted to support optical elements to receive and transmit the output of the laser diodes to the disks and to the detector. The three lenses are formed in the hollow plastic block in various embodiments.

8 Claims, 17 Drawing Sheets

MONOLITHIC CD/DVD READ/WRITE HEAD

CROSS REFERENCE TO THE RELATED APPLICATION

This application claims the benefit of U.S. Provisional Application Ser. No. 60/088,669 filed Jun. 9, 1998.

BACKGROUND AND SUMMARY

This invention relates generally to a CD and DVD read head optical system. The invention includes various configurations that combine CD and DVD reader optics into a monolithic moldable plastic assembly including a hollow plastic block which can be made better, faster and cheaper than current discrete component technology designs. The resultant read head optical system will be capable of reading either CD or DVD disks, and capable of writing CD-R disks.

The basic philosophy of the present invention is that optical coatings on plastic substrates (e.g. the dichroic combiner and the output/input beamsplitter) are difficult to produce and drive the cost to a level equivalent to independent component designs. Optical coatings in a solid plastic block would require bonding two plastic blocks together and this is as bad as the coating itself in terms of cost and labor investment. Therefore, square glass plates with the necessary optical coatings can be captured in a hollow plastic block with high alignment precision with low cost. Coating plastic surfaces is considered too risky and costly so coatings have been deposited on glass plates that. are inserted into molded plastic blocks which have integral molded lens surfaces and (in some cases) Total Internal Reflection (TIR) prism surfaces.

Four monolithic embodiments are disclosed. The first embodiment includes a 780 nm laser diode and a 655 nm laser diode with their output beams perpendicular to each other. Two entry surfaces are therefore required to be formed on the hollow plastic block. In the second embodiment, the output beams are parallel, with the 655 nm and 780 nm lasers side-by-side. Only one planar entry surface is required. The third embodiment is a system for use on laptop installations and having a low profile of 6 mm and a single planar entry surface. The fourth embodiment uses a multi-faceted diffractive combiner to merge two laser diode beams, which can be utilized in a low profile (6 mm) configuration for use on laptop installations.

DETAILED DESCRIPTION OF THE DRAWINGS

Figure 1:
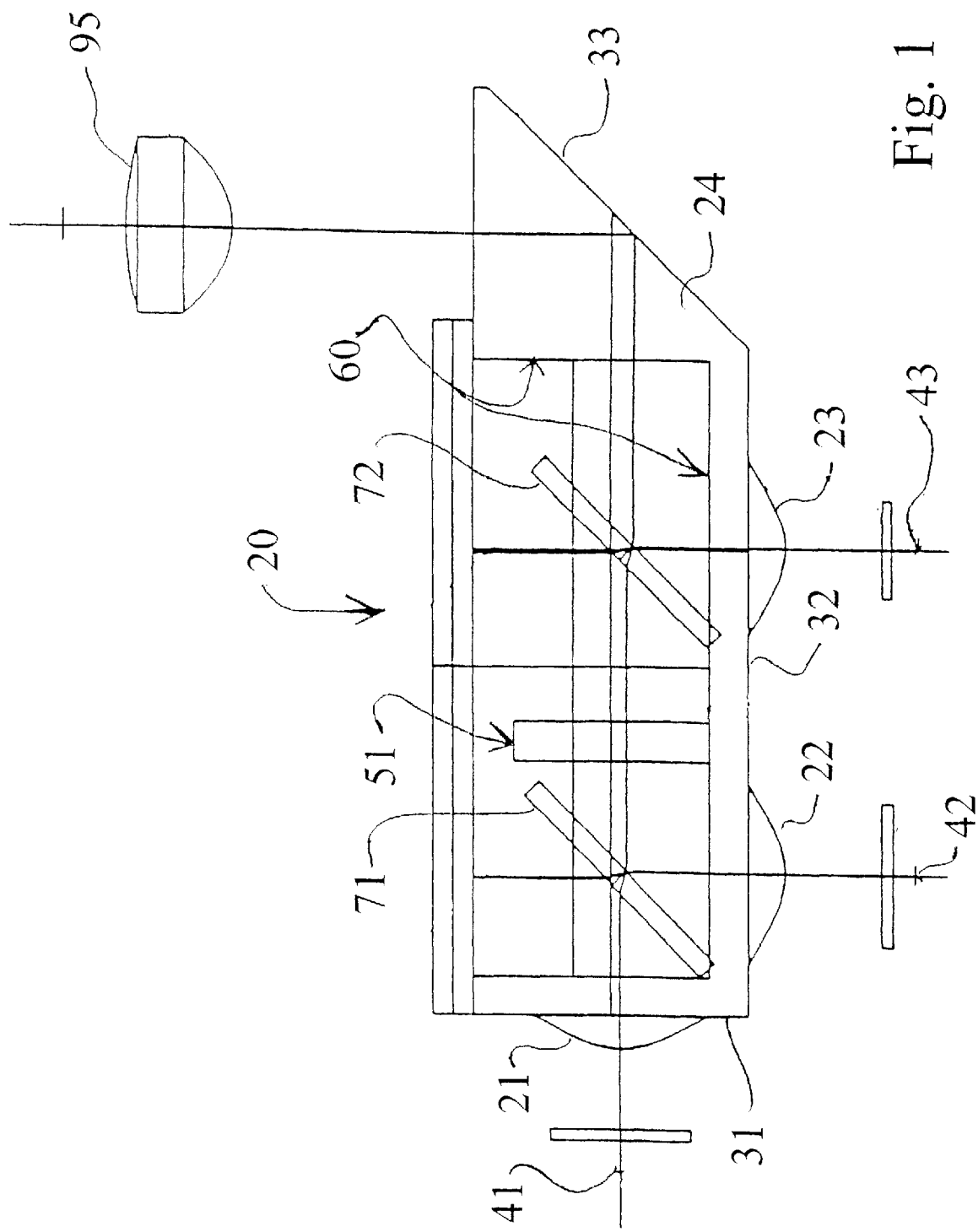
FIGS. 1–3 are schematic representations of the first embodiment of the invention, wherein the laser diode output beams enter the hollow plastic block through two different perpendicular entry surfaces.
Figure 2:
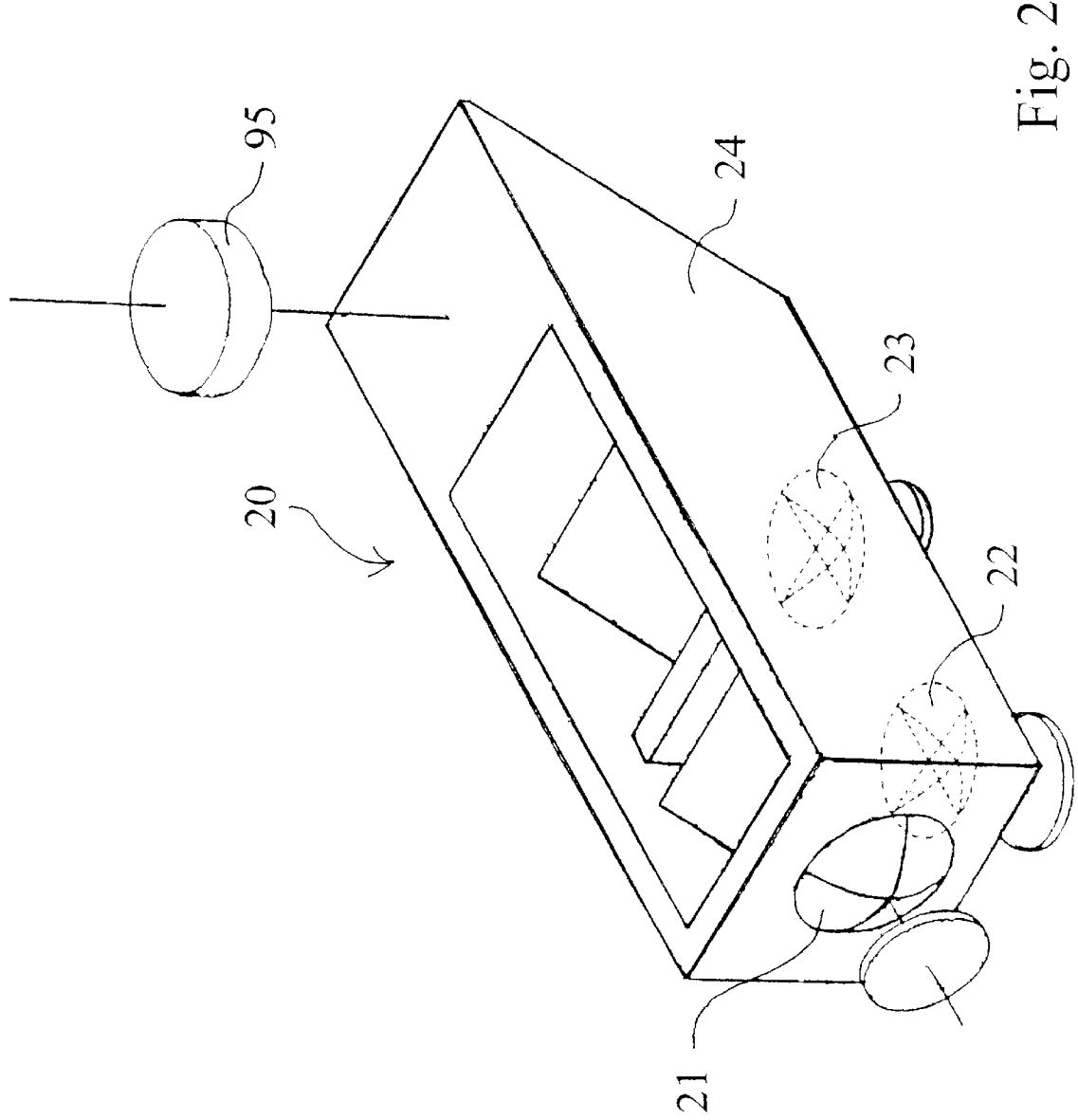
Figure 3:
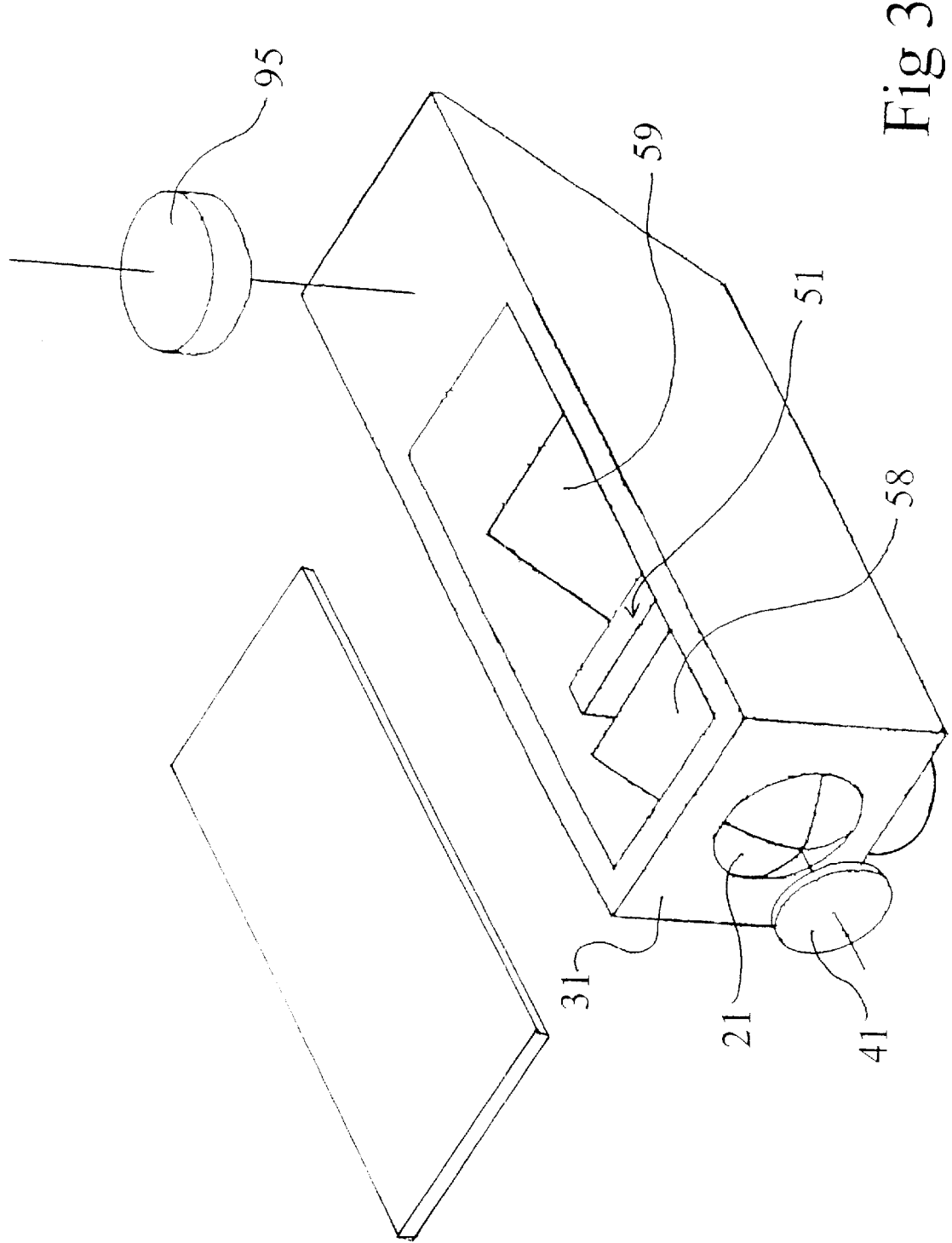
Figure 4:
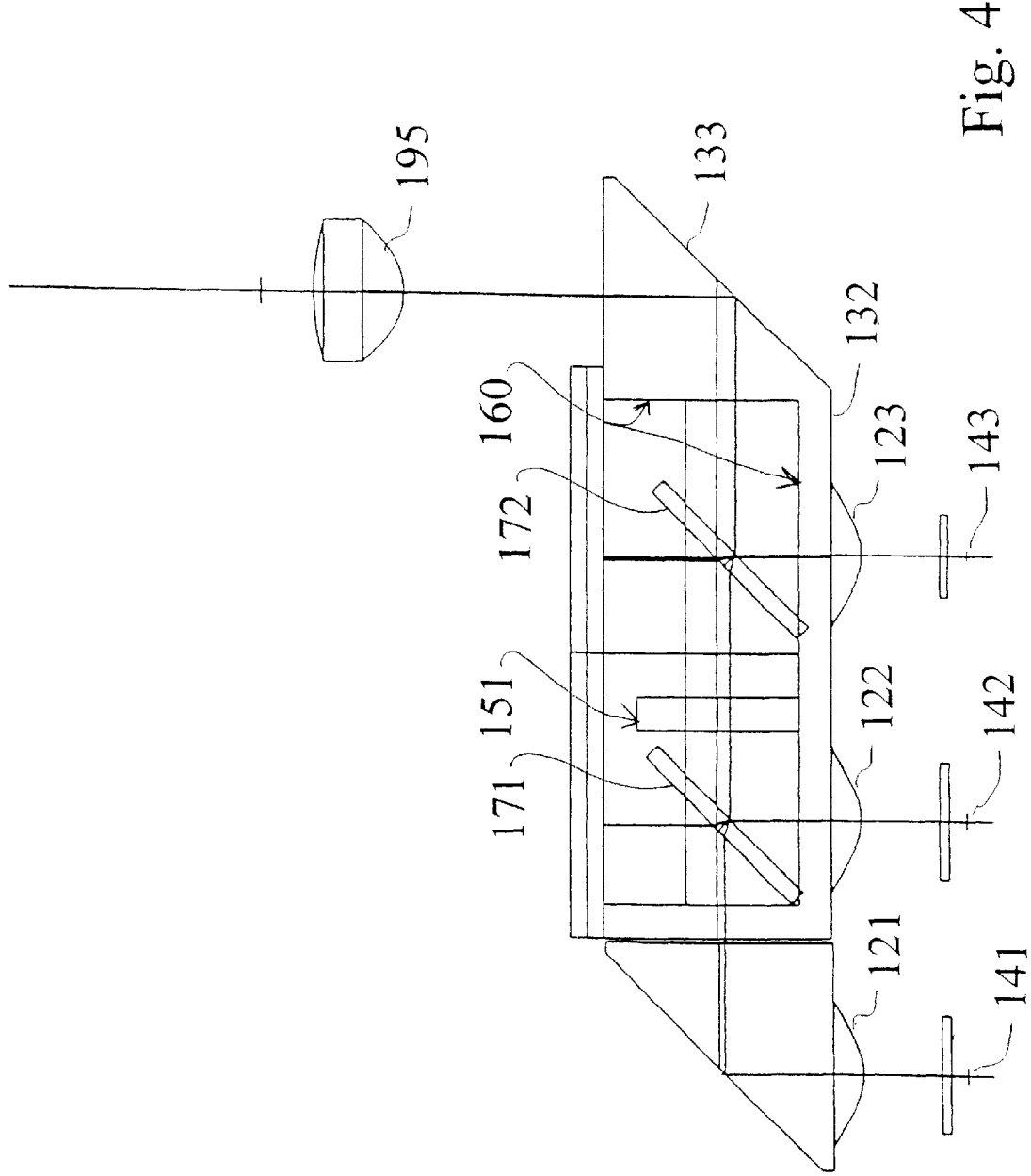
FIGS. 4–7 are schematic representations of the second embodiment of the invention, wherein the laser diode output beams and the detector beam enter the hollow plastic block through a single planar entry surface.
Figure 5:
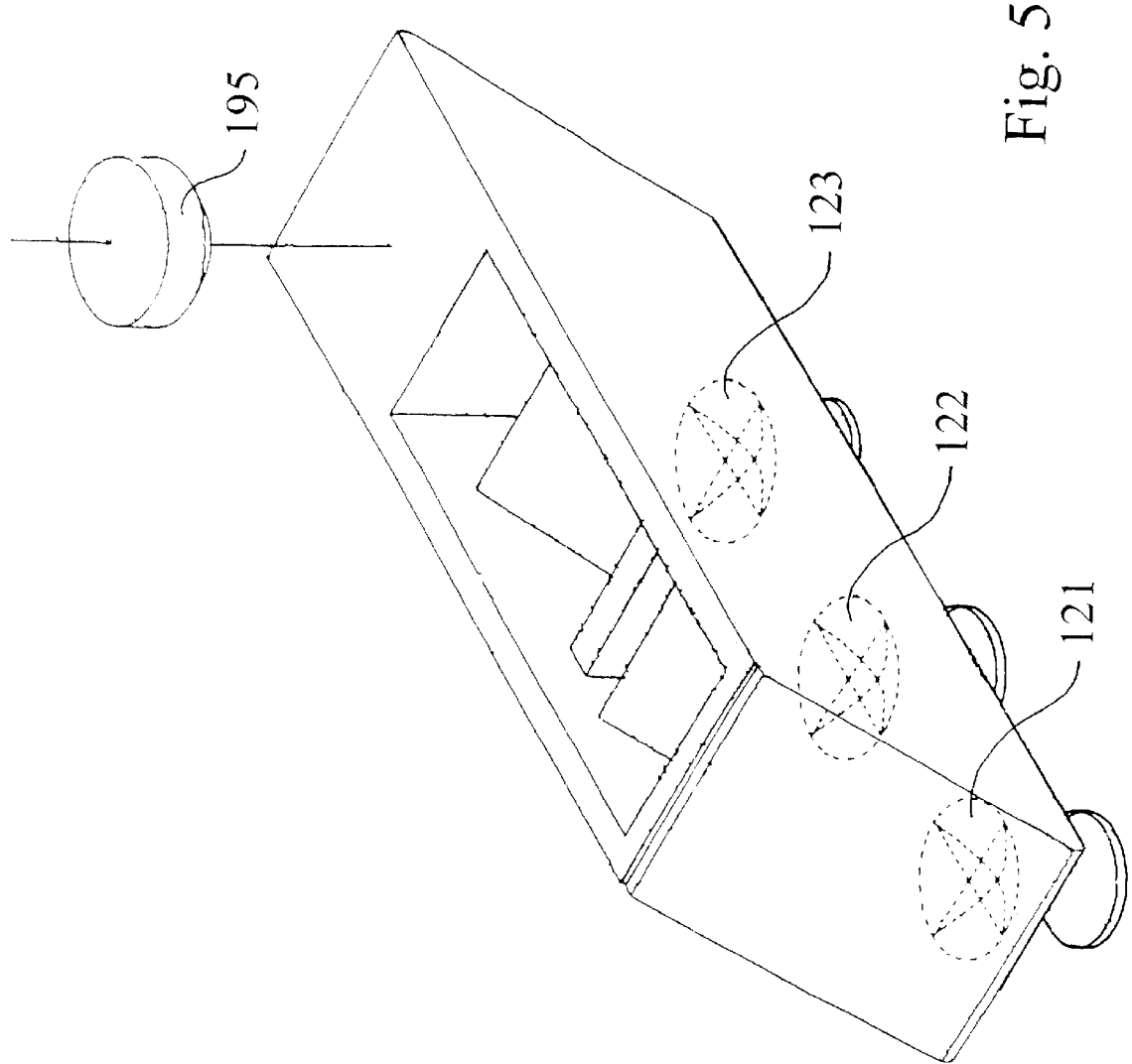
Figure 6:
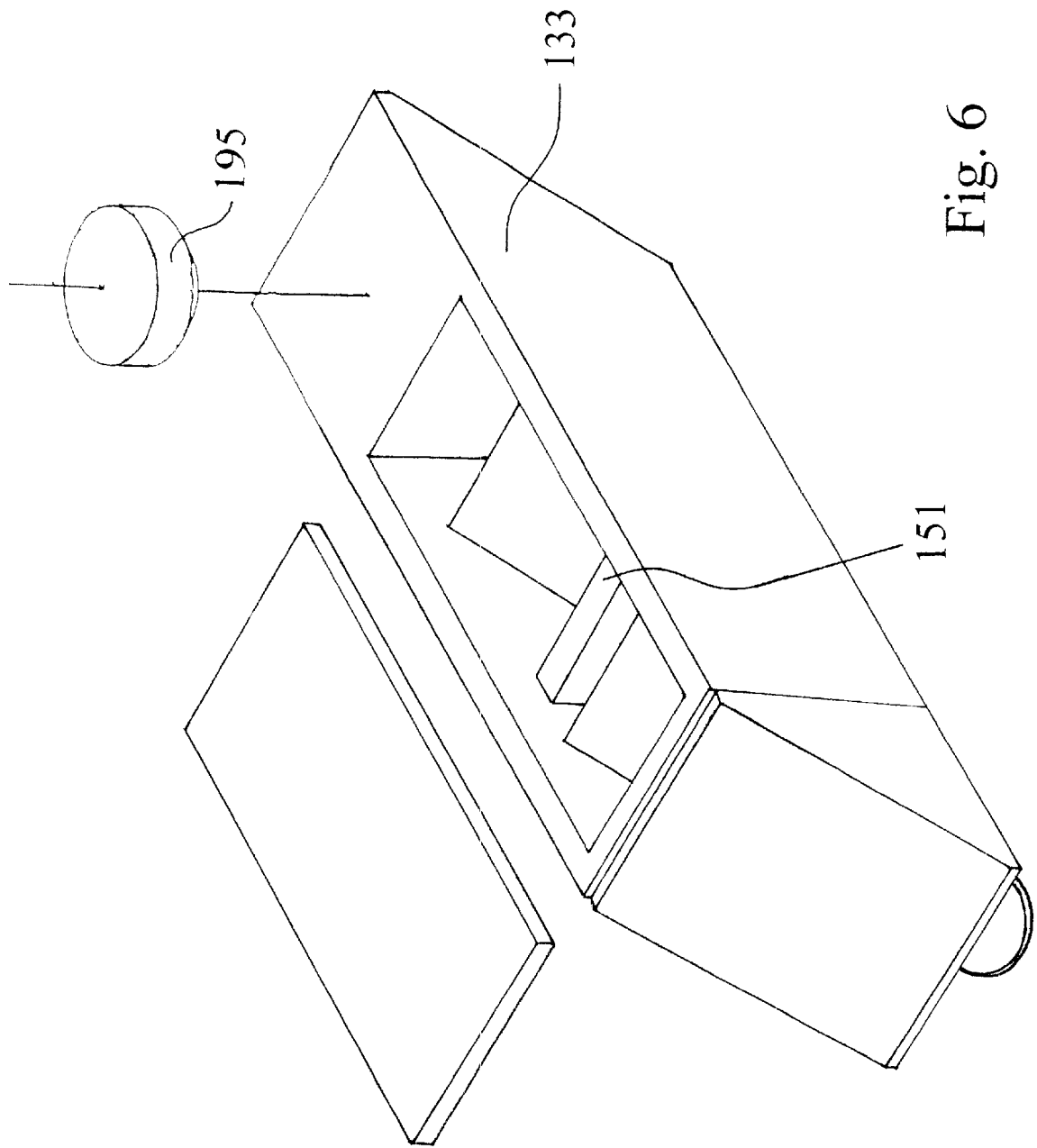
Figure 7:
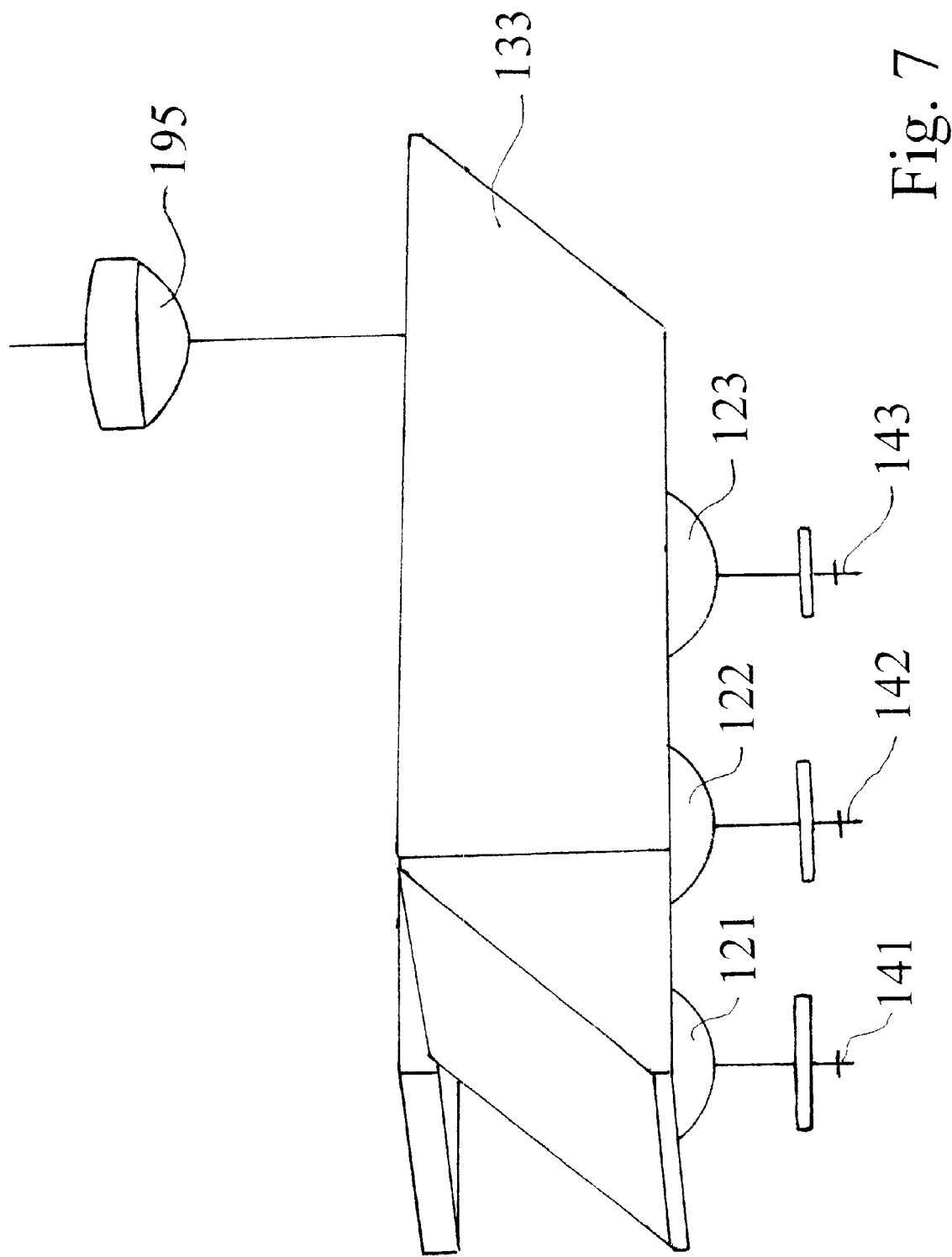
Figure 8:
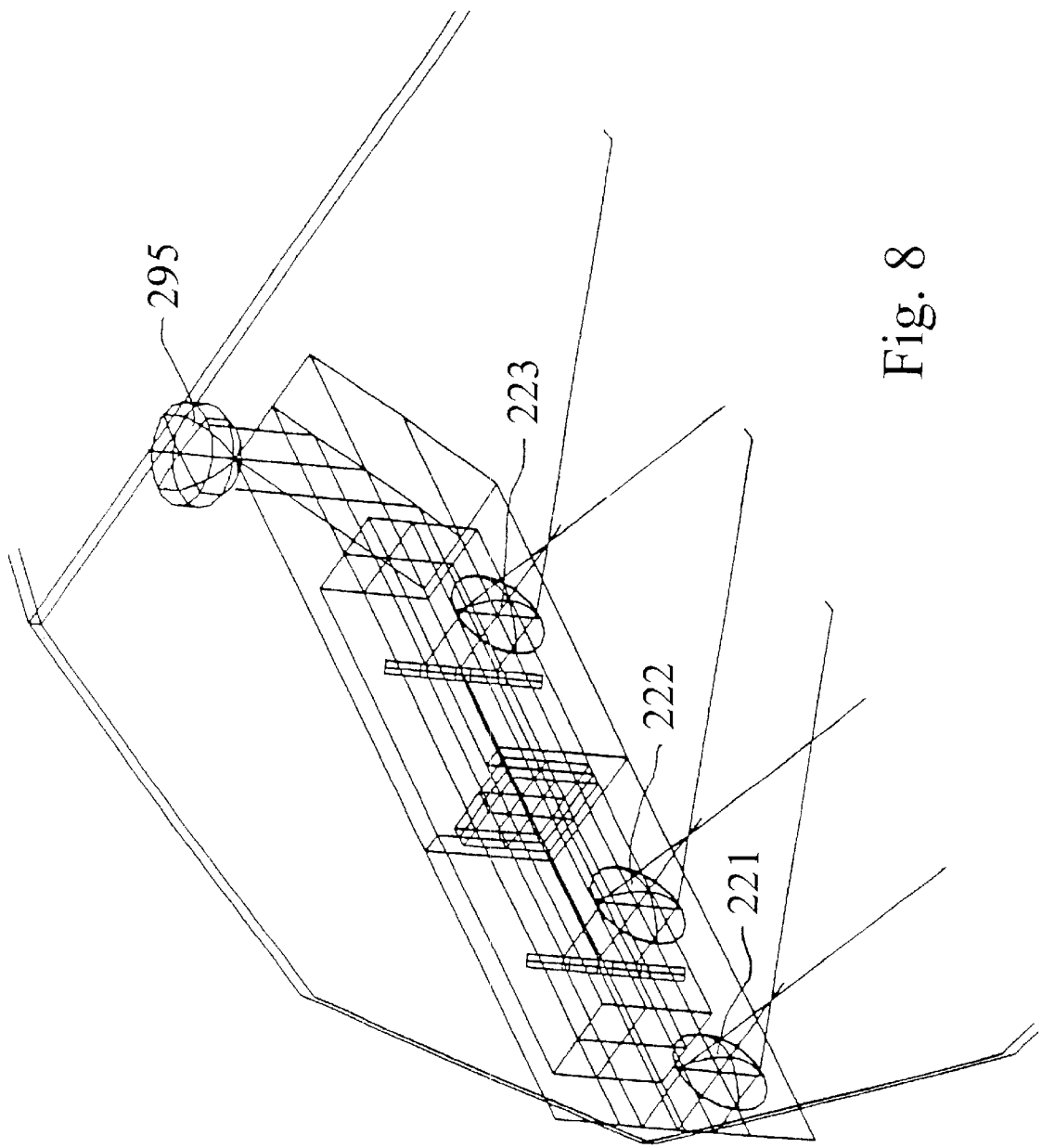
FIGS. 8–11 are schematic representations of the third embodiment of the invention, wherein a low profile (6 mm thick) hollow plastic block is utilized and wherein both laser diode output beams and a detector beam enter the block through a single planar entry surface.
Figure 9:
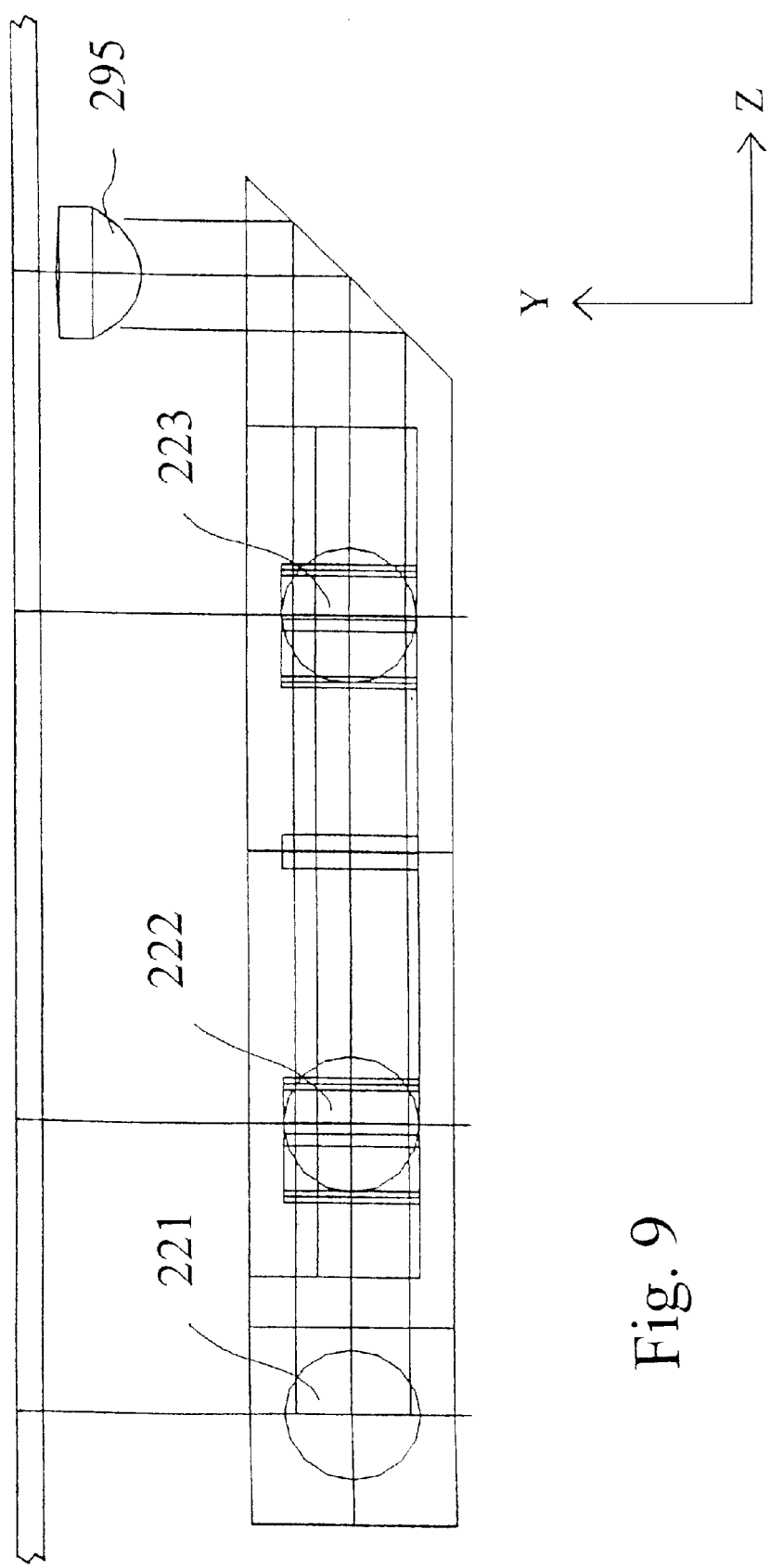
Figure 10:
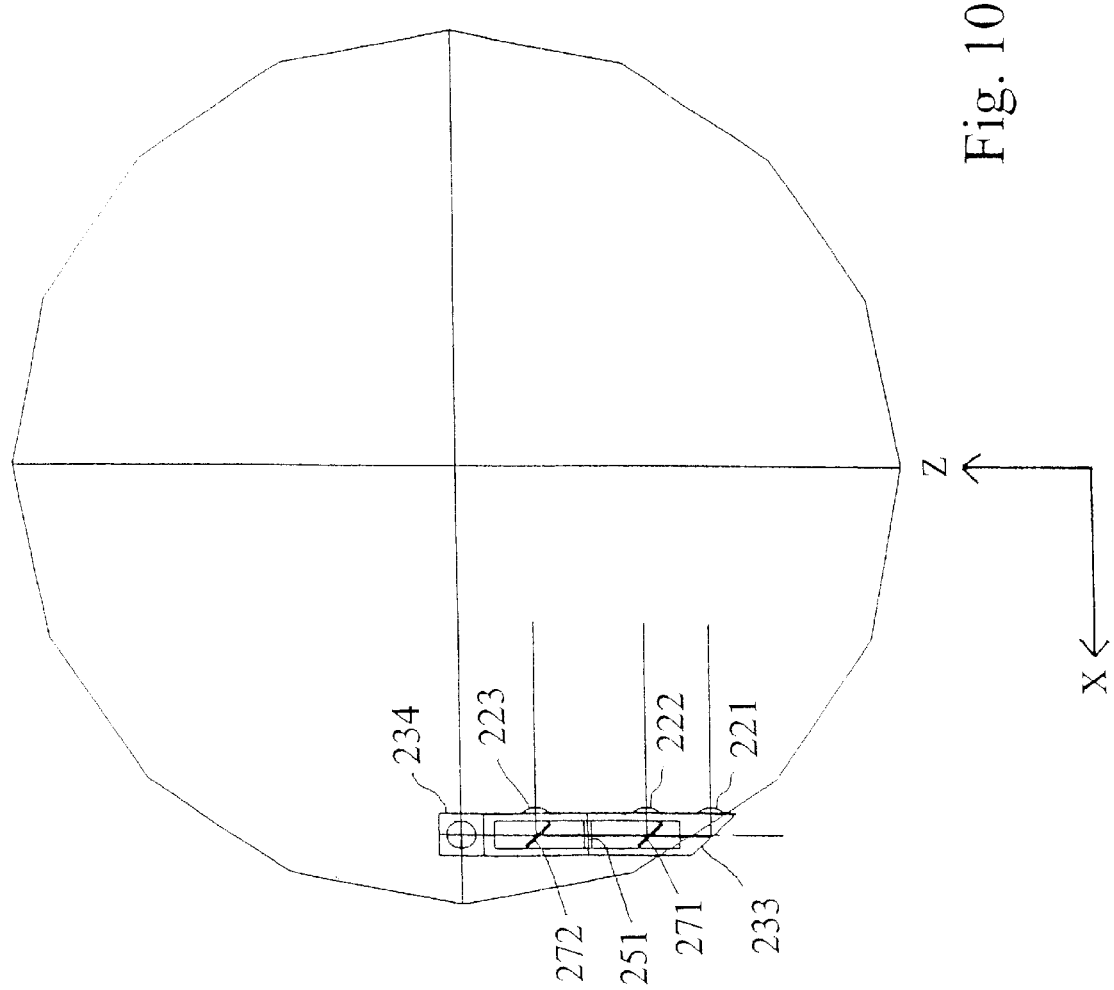
Figure 11:
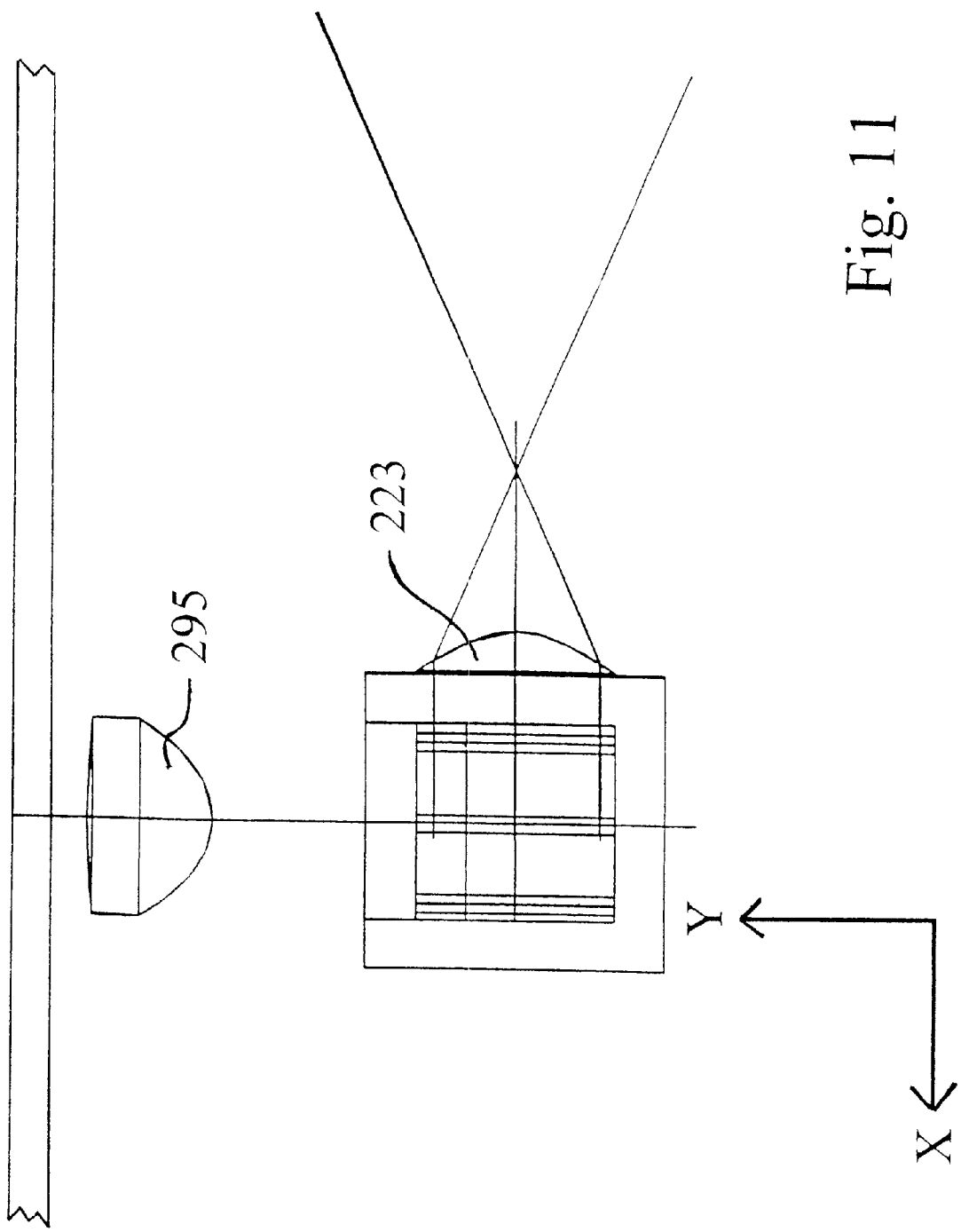

The first embodiment shown in FIGS. 1–3 includes a monolithic molded plastic assembly shown generally as 20. The assembly 20 includes a hollow plastic block 24 having first, second and third lenses 21, 22 and 23 integrally molded into the surface of hollow block 24. The first embodiment incorporates first lens 21 formed on entry surface 31 of block 24. Second and third lenses 22 and 23 are formed on planar entry surface 32 of block 24, which is perpendicular to first entry surface 31.

A first laser diode 41 has a 780 nm wavelength and is positioned and aligned so that its output beam enters lens 21. A second laser diode 42 has a 655 nm wavelength and is positioned and aligned so that its output beam enters lens 22. An integrally molded diffraction grating 51 is formed in cavity means 60. Dichroic plate glass beamsplitters 71 and 72 are positioned and captured within cavity means 60 so that they are automatically aligned with lasers 41 and 42. The output beams of laser diodes 41 and 42 are reflected off TIR surface 33 through objective lens 95 and onto the disk (not shown) being read. A six-segment detector 43 is aligned with third lens 23. Lenses 21 and 22 each use a plano-asphere lens with a diffractive plano surface to combine two laser diode outputs into a common collimated beam. In order for this concept to work, it is necessary to use the +1 order for the 780 nm laser and the +2 order for the 655 nm laser. This design arrangement maximizes the diffraction efficiency for the two wavelengths. By making the diffractive surface groove depth optimum for the 655 nm laser in the +2 order, a laser at 1300 nm would also have high diffraction efficiency in the +1 order. Because the 780 nm laser is not close to the 1300 nm wavelength, its +1 order diffraction efficiency will be poor. A 17% efficiency is achievable for the +1 order and about 68% will propagate into the unwanted +2 order. The diffractive surface is rotationally symmetric and easily produced by diamond turning methods, but the physical separation of the two laser diode chips is only 0.68 mm.

The first embodiment places the 780 nm laser diode at the left end of the block and the second embodiment places the 780 nm laser diode next to the 655 nm laser diode for easier attachment to the PCB. The second embodiment is preferred.

The system provides signal, focus and tracking data by means of a six segment detector 43 (quadrant for signal plus focus and two adjacent segments for tracking). The three-beam method is used by means of a diffraction grating surface molded onto a plate in the plastic block.

The second embodiment shown in FIGS. 4–7 uses three spherical lens surfaces 121, 122 and 123 with a non-rotationally symmetric diffractive structure 151 molded on the planar entry surface 132 of monolithic block 124.

The 655 nm laser 142 is diffracted in the +2 order and the 780 nm laser 141 is diffracted in the +1 order. The diffraction efficiency for the 780 nm laser beam is in the 17% range and the physical separation of the two laser diode chips would be about 0.68 mm again.

FIGS. 8–11 show the third embodiment wherein the laser diodes (not shown) have been folded out into a different plane and the system thickness reduced from about 23 mm to 6 mm. This arrangement could be used in laptop installations. Two TIR fold prisms 233 and 234 are used to keep the laser diodes in a common plane. Lenses 221, 222 and 223 are molded on a planar entry surface 232.

This low profile design uses inserted glass plates 271 and 272 for the coated elements.

An alternate approach would be to replace the TIR prism sections 233 and 234 of the design with coated glass plates captured in the plastic block. Molded monolithic systems may have unacceptable levels of thermal sensitivity (both dN/dt and CTE variation in lens position or focal length) and may have unacceptable levels of inhomogeneity.

The 6 mm block depth seems a practical limit (the walls of the molded part are at a minimum and the focal lengths of the lenses are at a practical minimum). The size of the voice coil mechanism will define the distance from the disk data plane to the bottom of the block. It is currently 12.7 mm and probably will not change very much because the focusing lens is at the proper distance from the disk as shown on the layouts.

The 40 mm block length could be reduced to about 33 mm for better moldability, but the 40 mm length may be needed to accommodate the laser diode structure.

Because TIR is used on the two prism faces to avoid reflective coatings and because the plastic material TIR angle is within 3 degrees of the fold angle, the block may be tilted in both the YZ and XZ planes by about 5 degrees to get some more margin on the TIR angle.

The plastic material would be COC (best molding quality, lowest birefringence, and best homogeneity). Molding issues are critical to this concept working to achieve the desired image quality because it is extremely hard to hold flat prism surfaces when the edges are so close to the optical clear aperture (due to the 6 mm dimension goal) and homogeneity is hard to achieve when the material has to flow down a 1.5 mm thick wall structure. The block width should be increased in the XZ plane to improve the wall thickness and material flow pattern.

The fourth embodiment uses a linear grating on a glass plate substrate. FIGS. 12–17 show this system geometry. Collimated beams 341a and 342a of 780 nm and 655 nm light, respectively, are incident to the grating normal 355 at +30 degrees and −24.6 degrees, respectively. The 780 nm beam is diffracted in the +1 order and the 655 nm beam is diffracted in the −1 order. The grating frequency is 640 g/mm.

First and second lenses 321 and 322 are formed in a double faceted molded extension 327 of hollow plastic block 324. Entry facets 328 and 329 are each planar and inclined to the grating normal 355 at +30 degrees and −24.6 degrees, respectively. A diffractive combiner grating 357 (FIG. 14) is provided in cavity means 360 to combine the output beams 341a and 342a. The double faceted extension 327 of block 324 functions together with diffractive combiner grating 357 to form a diffractive combiner.

The design issue for this fourth embodiment is to maximize the diffraction efficiency in the +1 and −1 orders for their respective wavelengths. The diffraction efficiency of a dielectric transmission grating is a function of the groove profile. If the groove profile is rectangular (crenelated), then 40% of the energy is propagated into the +1 order, 40% is propagated into the −1 order, and 20% is propagated into the remaining orders (primarily into the zero order). If the groove profile is sinusoidal, 33% of the energy is propagated into each of the −1, zero and +1 orders. If the profile is sawtooth, then approximately 50% of the energy is theoretically propagated into the +1 order and 50% into the −1 order.

In addition to the theoretical efficiency, there are manufacturing tolerance losses and a drop in efficiency with wavelength (since the profile slope is optimized at a single wavelength). A sawtooth grating optimized for 655 nm would have been about 50% diffraction efficiency but the 780 nm efficiency would be closer to 45%.

The issue, therefore, is whether the DVD reader at 655 nm can tolerate a drop in throughput of 0.50 when polarizing beamsplitters are currently used to maximize throughput. In addition, the laser diode light that is not propagated into the intended order becomes stray light which must be managed.

Figure 12:
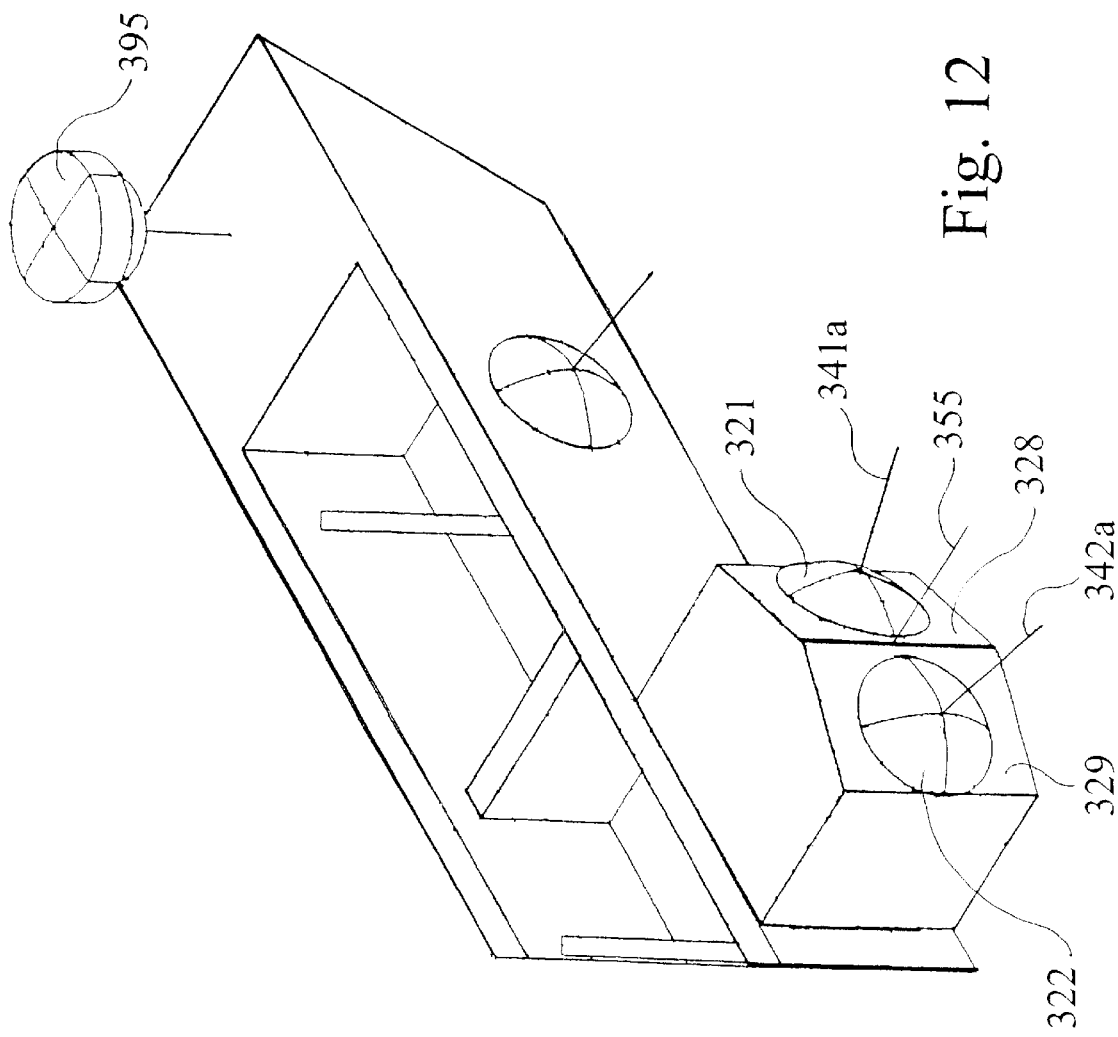
FIGS. 12–17 are schematic representations of the fourth embodiment of the invention, wherein a low profile (6 mm thick) hollow plastic block is utilized and wherein a double faceted entry of a diffractive beam combiner is molded onto the entry surface of the hollow plastic block.
Figure 13:
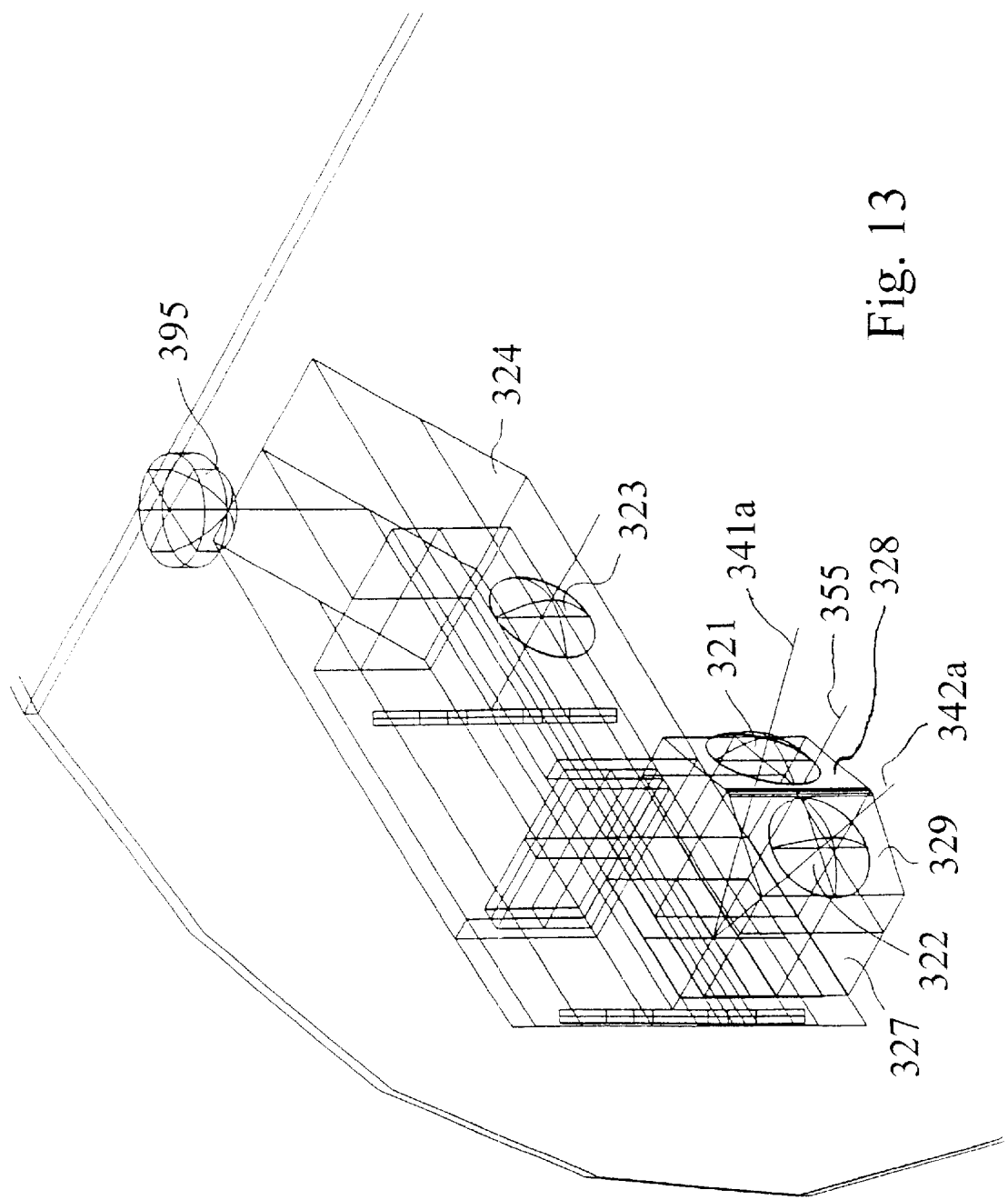
Figure 14:
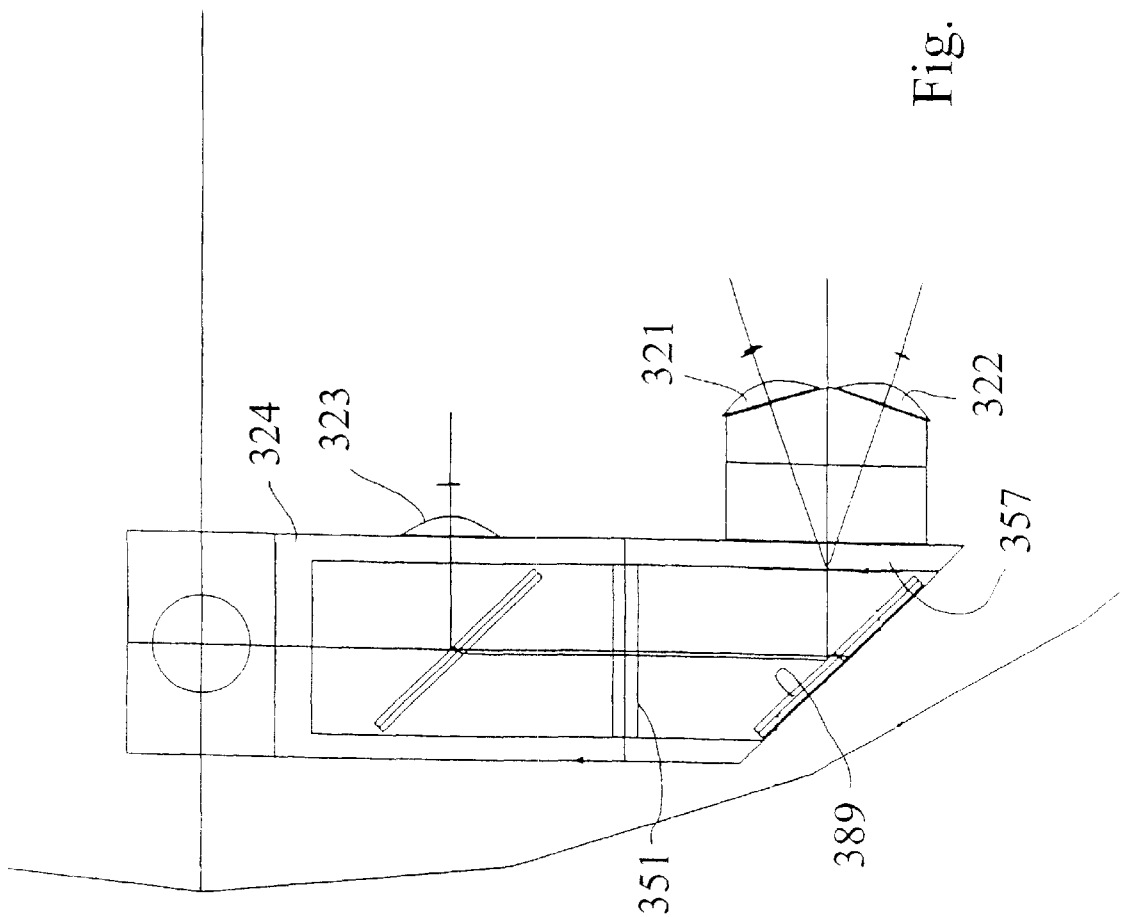
Figure 15:
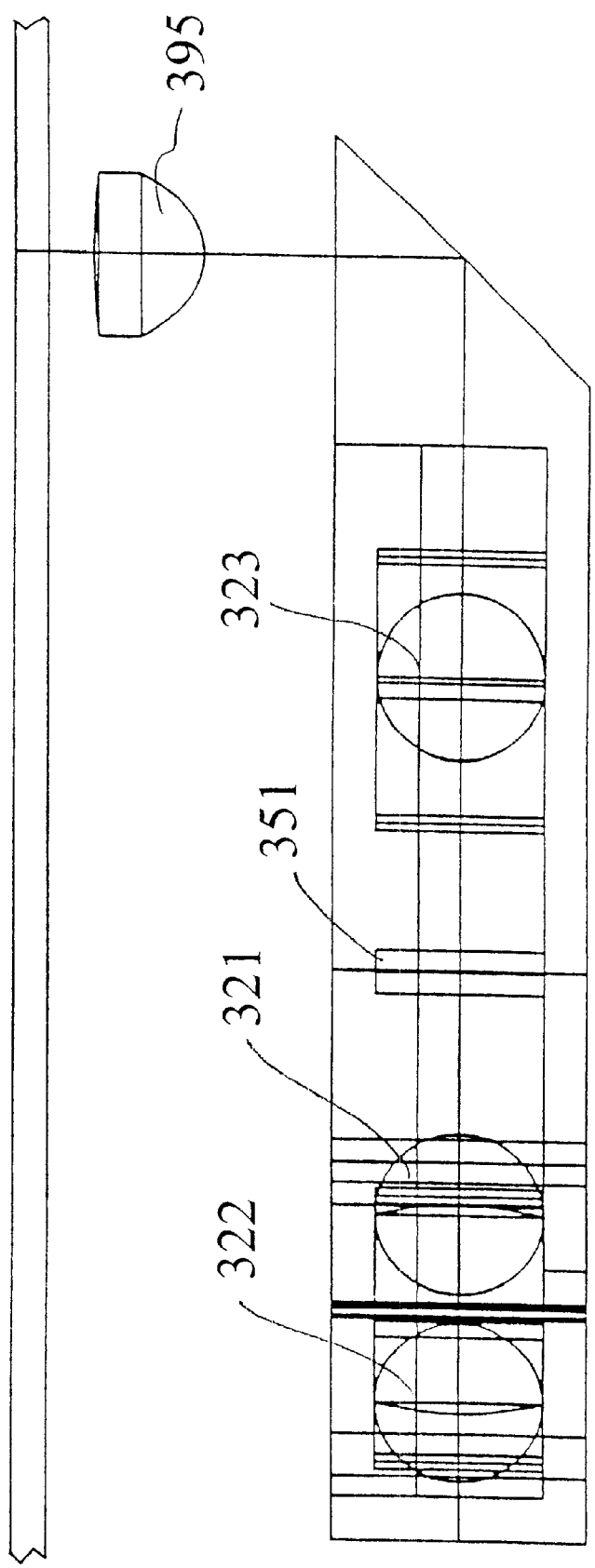
Figure 16:
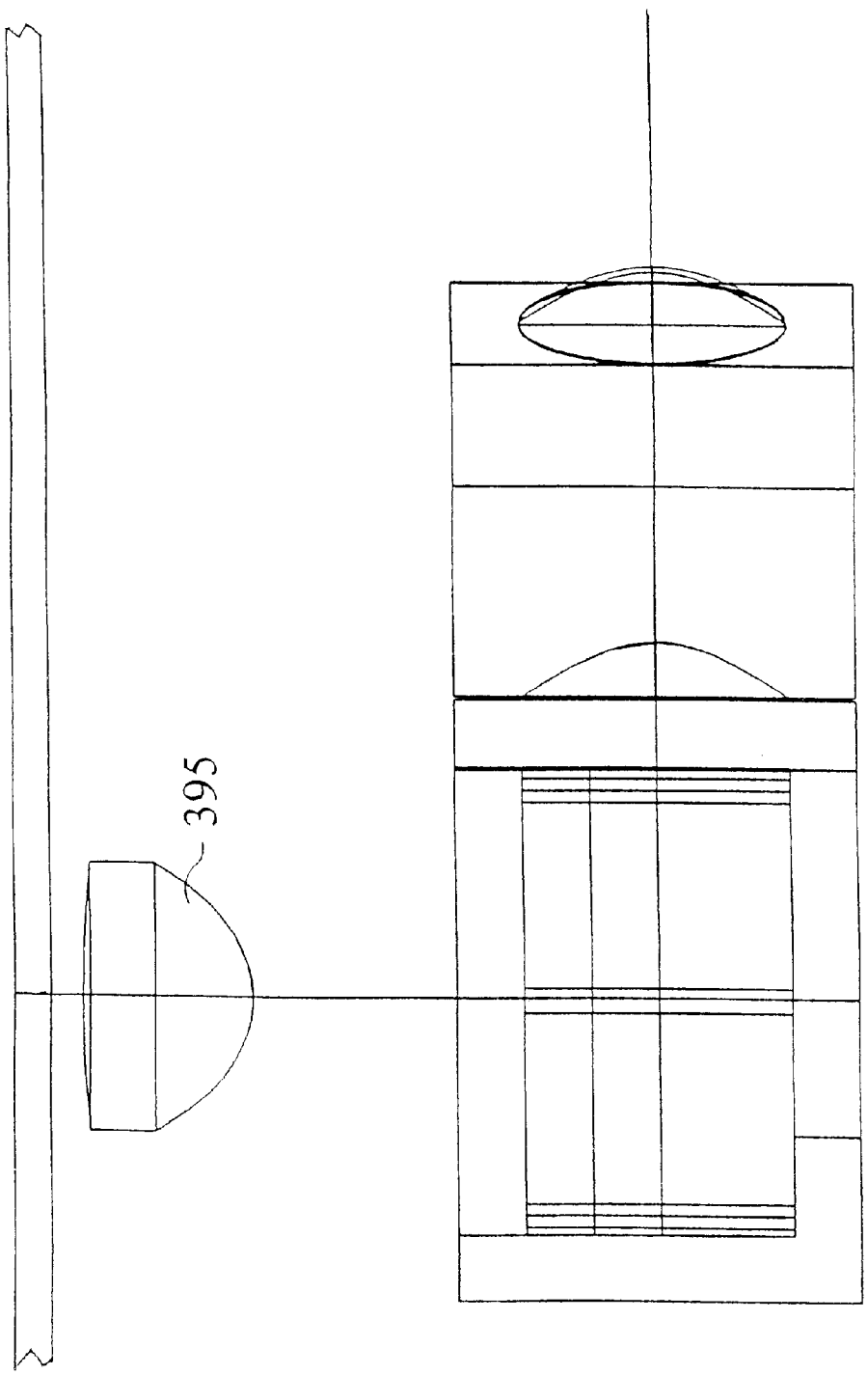
Figure 17:
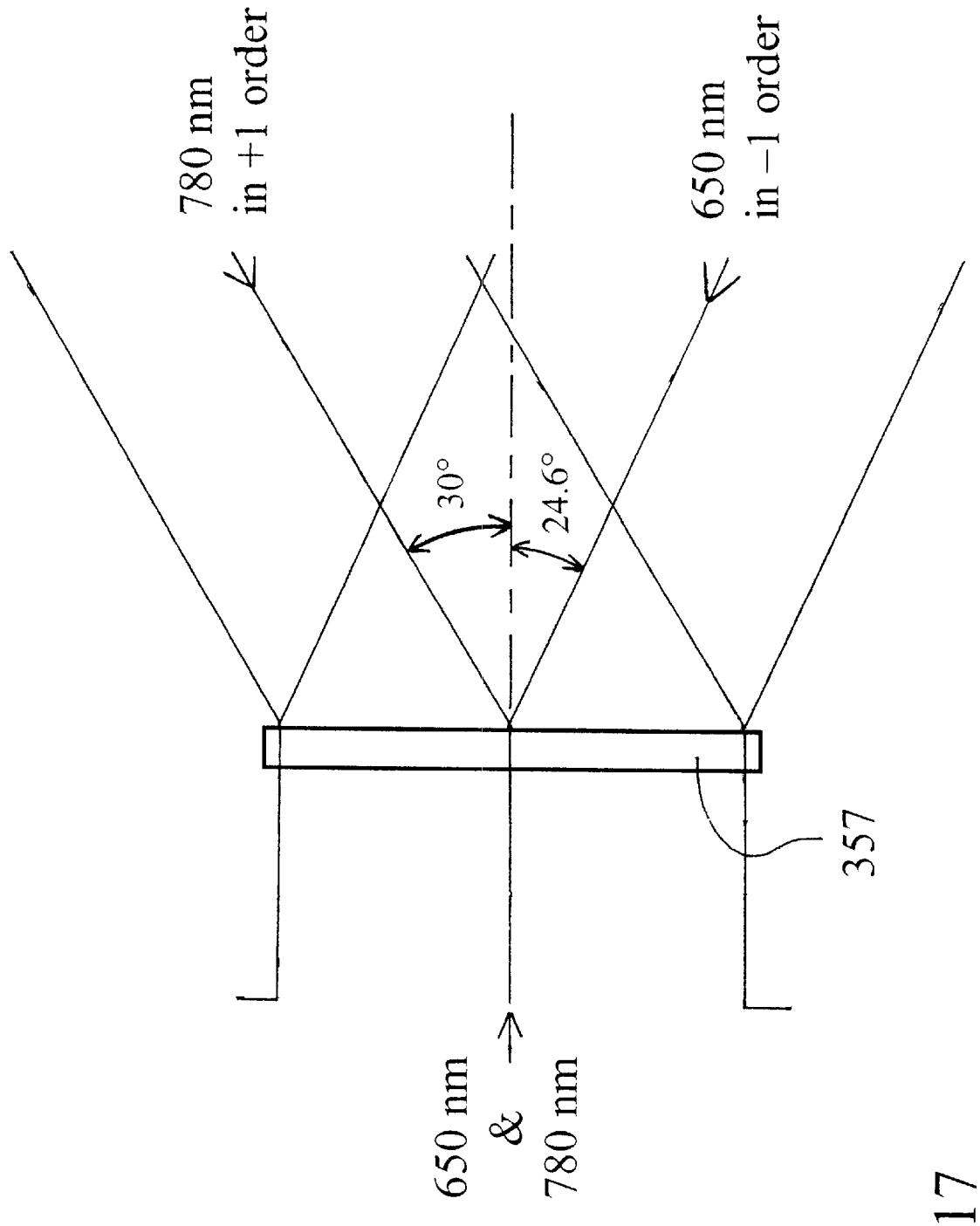

FIG. 14 shows a diffractive combiner to merge the two laser diode beams. A single TIR prism is used because the diffractive combiner needs an air interface to permit molding the surface. In order to mold the plastic block shown in FIG. 12, the back of the block (opposite the lenses) would be open rather than the top as shown in FIG. 12. The rear opening is needed to produce the grating structure. Keeping the optoelectronic components (diodes) on one side of the block requires the fold mirror 389 (it cannot be a TIR molded prism because the grating mold surface prevents this geometry). This means that a fold mirror is needed instead of a dichroic mirror. The same number of components must be inserted into the block. The fold mirror can be avoided if the two laser diodes do not lie on the same side of the block as the photodiode array. The grating combiner has a maximum of 50% energy into the desired beam.

The present invention includes optical mounting means formed integrally with hollow plastic block 24. For example, FIG. 4 includes beamsplitter mounting means 58 and 59 which are sized and placed to capture and support beamsplitters 71 and 72. By molding the beamsplitter mounting means 58 and 59 in this fashion, the beamsplitters, when inserted, are automatically aligned with lasers 41 and 42.

Lasers 41 and 42 are preferably 780 nm for reading CD disks and 655 nm for reading DVD disks. Wavelengths of approximately 780 nm and 655 nm may be utilized, provided a sufficient signal strength can be achieved.

It is to be understood that various design modifications may be made without departing from the spirit of the invention, such as the use of various hollow plastic block configurations and the insertion of alternate coated optical elements into the cavity of the hollow block.

What is claimed is:

1. A read head optical system capable of reading either CD or DVD disks, comprising:

a monolithic molded, hollow plastic block, said hollow plastic block having first, second and third lens surfaces integrally molded into the exterior surface of said hollow plastic block, said hollow plastic block also having first and second exterior entry surfaces, said first and second entry surfaces being perpendicular to each other, and wherein said first lens surface is molded on said first exterior entry surface and said second and third lens surfaces are formed on said second exterior entry surface, whereby the output beams of said first and second lasers enter said hollow plastic block perpendicularly to each other, a first laser diode aligned with said first molded lens, said first laser having a wavelength selected for reading CD disks, a second laser diode aligned with said second molded lens, said second laser having a wavelength selected for reading DVD disks, detector means aligned with said third molded lens for providing signal, focus and tracking data for said optical read head, and cavity means for supporting optical elements wherein said cavity means is formed in said hollow plastic block, said cavity means being molded to capture and align one or more optically coated glass plates to receive and transmit the output of said first and second lasers to said disks and to said detector means.

2. The apparatus of claim 1 further comprising:

beamsplitter mounting means formed in said cavity means to align beamsplitters with said lens surfaces, first and second dichroic plate glass beamsplitters carried in said cavity means, and an integrally molded diffraction grating formed in said cavity means between said dichroic plate beamsplitters.

3. The apparatus of claim 2 wherein a totally internal reflection prism surface is integrally formed in said hollow plastic block to reflect the output beam of said first laser into said cavity means.

4. The apparatus of claim 1 wherein said hollow plastic block carries a diffractive combiner means for carrying said first and second lens surfaces and for diffractively combining the output beams of said first and second lasers.

5. The apparatus of claim 2 wherein said diffractive combiner means has a double faceted molded extension in which said first and second lens surfaces are formed.

6. The apparatus of claim 2 wherein said first laser has a wavelength of approximately 780 nm, said second laser has a wavelength of approximately 655 nm, and further comprising:

diffraction means for diffracting said 780 nm laser in the +1 order and for said 655 nm laser in the −1 order.

7. The apparatus of claim 6 wherein said diffraction means comprises a glass plate substrate with a linear surface grating.

8. The apparatus of claim 1 wherein said first laser has a wavelength of approximately 780 nm, said second laser has a wavelength of approximately 655 nm, and further comprising:

a diffractive plano surface means molded into said cavity means to maximize the diffraction efficiency for said 780 nm laser in the +1 order and for said 655 nm laser in the +2 order.

* * * * *